United States Patent [19]
Deal et al.
[11] Patent Number: 4,849,066
[45] Date of Patent: Jul. 18, 1989

[54] METHOD FOR SELECTIVELY ETCHING INTEGRAL CATHODE SUBSTRATE AND SUPPORT UTILIZING INCREASED ETCHANT TURBULENCE

[75] Inventors: Samuel B. Deal, Manheim Township, Lancaster County; Donald W. Bartch, Hellam Township, York County; Wayne R. Poff, Manheim Township, Lancaster County, all of Pa.

[73] Assignee: RCA Licensing Corporation, Princeton, N.J.

[21] Appl. No.: 248,219

[22] Filed: Sep. 23, 1988

[51] Int. Cl.⁴ .......... C23F 1/02; B44C 1/22; C03C 15/00; C03C 25/06

[52] U.S. Cl. .......... 156/640; 156/345; 156/656; 156/659.1

[58] Field of Search .......... 156/637, 639, 640, 641, 156/642, 651, 652, 655, 659.1, 664, 345

[56] References Cited

U.S. PATENT DOCUMENTS

| | | | |
|---|---|---|---|
| 3,432,900 | 3/1969 | Kerstetter | 29/25.17 |
| 4,376,009 | 3/1983 | Kunz | 156/640 |
| 4,441,957 | 4/1984 | Poff | 156/656 |

FOREIGN PATENT DOCUMENTS

| | | |
|---|---|---|
| 4027504 | 9/1965 | Japan . |

OTHER PUBLICATIONS

TN No. 1159 dated Jul. 23, 1976 by John Coryell Turnbull entitled, "One-Piece Bimetal Cathode Cup and Sleeve".

*Primary Examiner*—William A. Powell
*Attorney, Agent, or Firm*—Eugene M. Whitacre; Dennis H. Irlbeck; Vincent J. Coughlin, Jr.

[57] ABSTRACT

A method for preparing an integral cathode substrate and support includes the steps of placing formed metal parts on a pin holder, masking selected surface portions of the formed metal parts, etching the unmasked surface portions, and then removing the mask. The present method is an improvement over prior methods since the parts are arranged in a staggered array to increase the turbulence of the etchant during the etching step. The turbulence provides additional oxygen to increase the rate and uniformity of the etching.

7 Claims, 3 Drawing Sheets

METHOD FOR SELECTIVELY ETCHING INTEGRAL CATHODE SUBSTRATE AND SUPPORT UTILIZING INCREASED ETCHANT TURBULENCE

BACKGROUND OF THE INVENTION

The invention relates to a novel method for selectively etching an integral or unitary cathode substrate and support; and particularly, although not exclusively, to selectively etching a cylindrical one-piece bimetal cathode substrate and support with greater efficiency and at higher yield than previously achieved.

A one-piece bimetal cathode substrate and support sleeve is disclosed by J. C. Turnbull in RCA Technical Notes, TN No. 1159 mailed July 23, 1976. The one-piece part is described generally as a cup-shaped nickel-alloy cathode substrate integrally supported on a thin cylinder and endwall of a structural alloy such as a nickel-chromium alloy. The part is fabricated from a bimetal laminate comprised of layers of the two alloys which are clad or otherwise joined together.

The one-piece bimetal part has been fabricated by the general method disclosed in U.S. Pat. No. 3,432,900 issued Mar. 18, 1969 to D. R. Kerstetter. By this method, a cup-and-sleeve is deep drawn from a bimetal laminate strip. Then, selected portions of the nickel-alloy layer are masked with a temporary coating of an etch-resistant material and then the unmasked portions are etched away with a liquid etchant. In an alternative method disclosed in U.S. Pat. No. 4,441,957 issued Apr. 10, 1984 to W. R. Poff et al., selected portions of the nickel-alloy layer are selectively masked by temporarily pressing surface portions of an etch-resistant, compressible sheet, such as a silicone rubber sheet, against selected surface portions of the part. In both of the prior methods, the unmasked portions of the nickel-alloy layer are etched away either by immersing the part in a bath of liquid etchant or by pumping the liquid etchant into contact with the part.

In a mass-production form of the Poff et al. method, a plurality of cylindrical parts are mounted on separate mandrels with all of the endwalls in a plane, and the endwalls pressed into a common compressible sheet. The mandrels are arranged in an orthogonal array of 25 rows and 12 columns. Two of the centrally located mandrels are replaced by a support member within the chamber housing to provide structural support. The sheet constitutes one wall of a common chamber housing all of the parts. With the chamber filled with liquid etchant, etchant is pumped into, through and out of the chamber. Attempts to mass produce parts by the Poff et al. method, by shortening the etching time and increasing the number of parts in the chamber, were marred by the formation of blemishes and other defects on the etched parts. These defects were believed to be caused by tiny bubbles in the chamber which blocked or retarded the etching in local areas on the surface of the parts. Various attempts to overcome the problem, as by increasing the flow rate of etchant through the chamber or by channeling the flow of etchant in the chamber, reduced the prevalence of some defects but increased the prevalence of other defects.

U.S. Pat. No. 4,376,009 issued on Mar. 8, 1983 to Kunz discloses a limp stream method of etching an integral cathode substrate and support. In a limp stream method of etching, etchant floods the surface of a part except where the surface is masked. The stream is applied intermittently to permit the acid to drain away and to allow gases generated by the chemical reaction to escape when the stream is not impinging. The Kunz method, like the Poff et al. method, utilizes a chamber housing having an orthogonal array of mandrels arranged in 25 rows and 12 columns with two of the mandrels, removed from the center of the array, replaced by a support member. The resulting parts were marred by the presence of blemishes, in particular unetched islands of nickel-alloy, overlying the nickel-chromium structural alloy. It is believed that the incomplete or non-uniform etching of the nickel-alloy layer is caused by stagnant pools of etchant within the chamber housing.

SUMMARY OF THE INVENTION

In the novel method, a plurality of formed metallic parts, each of which includes a cathode substrate and an integral support therefor, are mounted in spaced relation on a pin holder. The parts are disposed in a staggered array to increase the turbulence of an etchant. The turbulence provides more oxygen to an etchant for a more complete removal of material. Additionally, the turbulence created by the staggered array provides a faster interchange of fresh etchant at the surface, minimizes the formation of stagnant pools of etchant, and, surprisingly, significantly increases the bath life of the etchant.

DETAILED DESCRIPTION OF THE PREFERRED EMBODIMENTS

In this document, "limp stream" means a stream of liquid whose direction is determined principally by the force of gravity, and "downwardly" means in the direction of the force of gravity.

Figure 1:
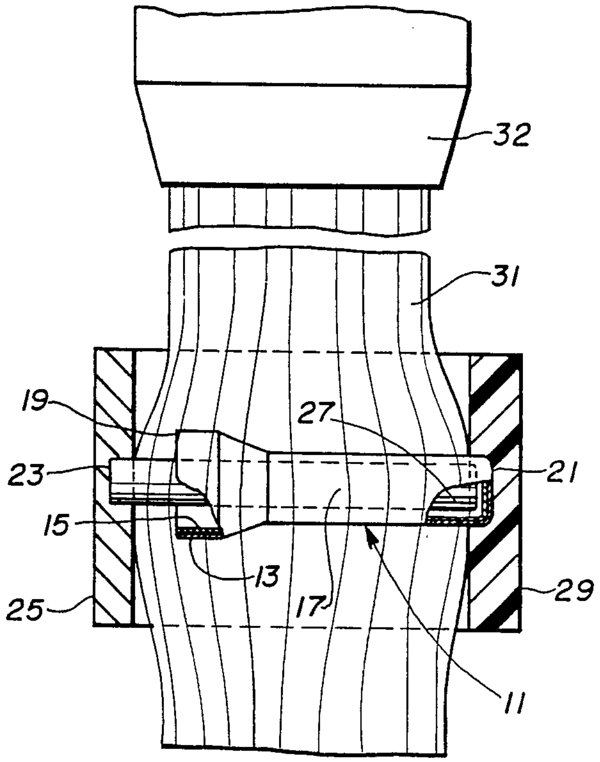
FIG. 1 is a fragmentary partially-sectional elevational view of a formed bimetal part being etched by a limp stream of etchant.

FIG. 1 shows a typical formed bimetal part 11 being etched by a limp stream of etchant 31. The part 11 is deep-drawn from a bimetal strip so as to provide a cup-shaped structure with a cathode-substrate nickel-alloy layer 13 on the outside and a structural nickel-chromium alloy layer 15 on the inside. A typical cathode-substrate alloy consists essentially of at least 94.90 weight-percent nickel and up to about 0.05 weight-percent silicon and magnesium. The part 11 is comprised of a cylindrical sleeve 17 about 2.16 mm (85 mils) at its narrowest outside diameter and about 8.76 mm (345 mils) in overall height. The sleeve 17 flares out and is open at one end 19 and is closed by an endwall 21 at the other end. The cathode-substrate alloy layer 13 is about 0.028 mm (1.1 mils) thick and the structural alloy layer 15 is about 0.048 mm (1.9 mils) thick. The cathode-substrate alloy layer 13 is much more soluble in certain etchants than the inner layer 15, particularly in relatively dilute acids. This differential is exploited in the novel method. In preferred forms of the novel method, the outer layer 13 is soluble and the inner layer 15 is substantially insoluble in the etchant.

The formed cup-shaped part 11 is placed on an upstanding cylindrical mandrel 23 which is supported on a base plate 25. The inner surface of the endwall 21 is in contact with the upper end surface 27 of the mandrel 23. Preferably, the contacting surfaces should substantially mate with one another. A sheet 29 of compressible etch-resistant material is pressed against the outer surface of the endwall such that the sheet 29 is compressed and presses against the adjacent portion of the sidewall thereby masking selected areas of the part 11. The greater the pressure, the greater the amount of sidewall 17 that is covered by the sheet 29. The assembly is now rotated to the position shown in FIG. 1 with the mandrel 23 horizontal and the space between the base plate 25 and the sheet 29 in a vertical position.

With the part 11 and the sheet 29 in this position, a solid limp stream of the liquid etchant 31, which in this embodiment is a 32 weight-percent solution of nitric acid at a temperature of about 80° C., is intermittently poured downwardly from a nozzle 32 through the space between the plate 25 and the sheet 29. The acid contacts with and dissolves the unmasked portions of the cathode-substrate layer 13. The etchant may also contact the structural alloy layer 15 but, since the structural alloy layer 15 is substantially insoluble in the etchant, substantially no dissolution takes place. As shown in FIG. 1, the etchant 31 floods the surfaces of the part 11 except where the surface is masked. The stream 31 can be applied intermittently by moving the nozzle 32 horizontally back and forth over and past the part 11. When the stream is not impinging on the part, acid in contact with the part is draining by gravity, and gases generated by the chemical reaction escape to the ambient. When the stream 31 again impinges on the part 11, it replenishes the acid on the part and also drives the gases away from the part. As a result, gases do not inhibit the reaction, and more uniform etching of the unmasked surfaces is obtained. These benefits are achieved with the use of far less acid than is required by prior methods of applying the acid to the part. Spraying liquid acid on the unmasked surfaces of the part does not produce as uniform etching and requires more acid than does the solid-stream method described here.

Figure 2:
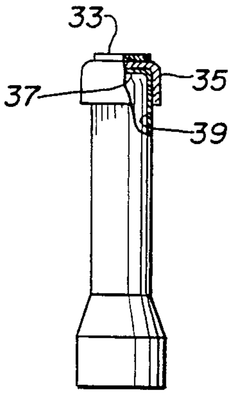
FIG. 2 is a partially broken-away elevational view of the completed etched bimetal part shown in FIG. 1 after the cathode coating has been applied to the cathode substrate thereof.

When the etching step is completed, the etchant 31 and the sheet 29 are removed. Then, the etched part 11 is removed from the mandrel 23, rinsed in deionized water in a vacuum flask to remove excess etchant and then dried at room temperature. Subsequently, a cathode coating is applied to the outer surface of the endwall 21, which was masked by the sheet 29. As shown in FIG. 2, a cathode coating 33 resides on a cap 35 of cathode-substrate nickel alloy, which is the unetched portion of the layer 13 of FIG. 1. This cap 35 is supported on an endwall 37 and a sidewall 39 of the structural nickel-chromium alloy, which is substantially insoluble in the etchant used and is the unetched structural layer 15 of FIG. 1.

Figure 3:
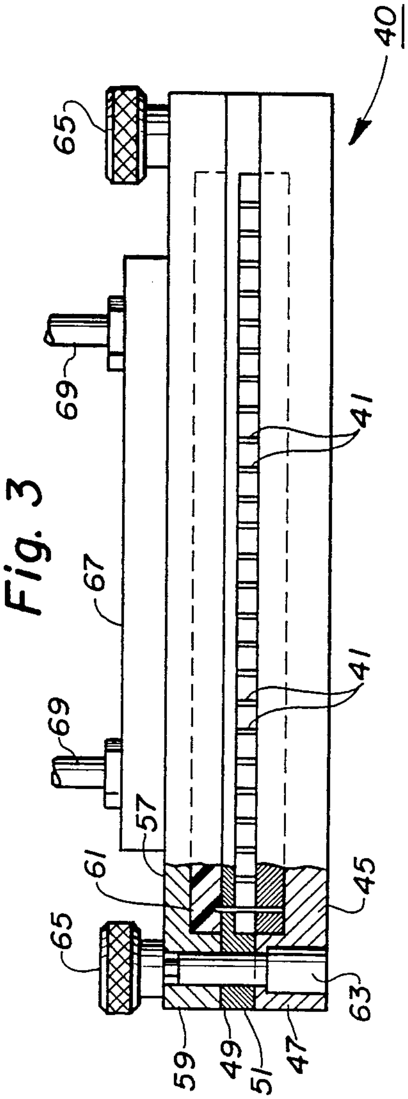
FIGS. 3 and 4 are partially-sectional front and side elevational views, respectively, of an apparatus for etching a batch of bimetal parts according to the novel method.
Figure 4:
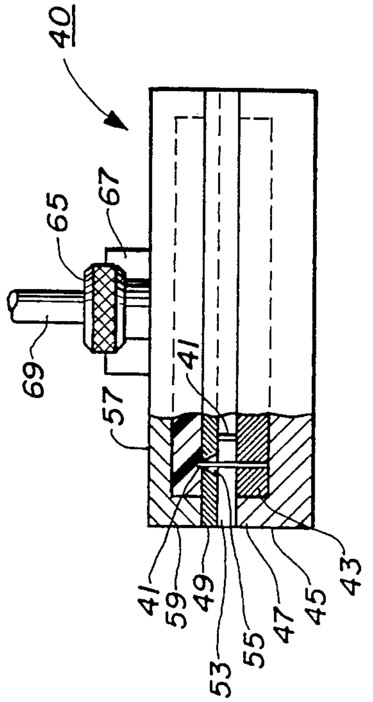

The novel method may be practiced with the fixture 40 shown in FIGS. 3 and 4. This fixture 40 comprises a staggered array of pins or mandrels 41 set in spaced relation in a pin holder 43.

Figure 5:
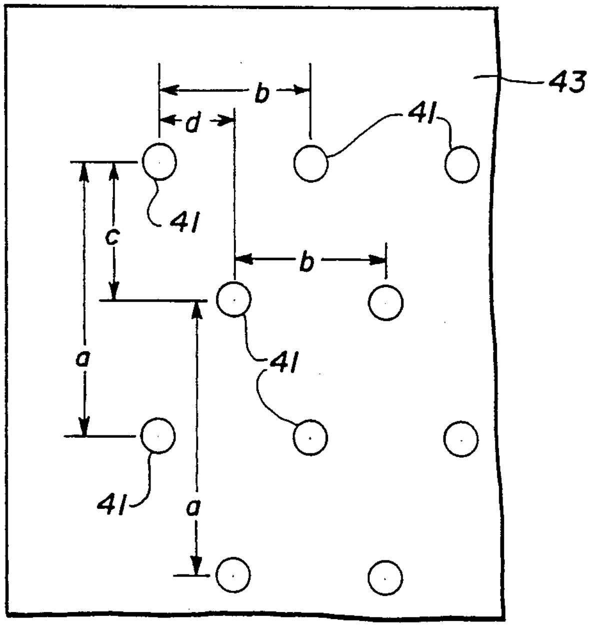
FIG. 5 is a partially-sectional top view of a novel pin-holder and mandrels.

There are a total of 318 mandrels 41 disposed on the pin holder 43. The mandrels are arranged in staggered rows and columns as shown in FIG. 5. By convention, th columns are disposed vertically and the rows are disposed horizontally. The spacing, a, between adjacent mandrels 41 in each column is about 11.43 mm (0.45 inch) and the spacing, b, between adjacent mandrels 41 in each row is about 6.35 mm (0.25 inch). The even numbered columns and rows are offset or staggered with respect to the odd numbered columns and rows by a vertical spacing, c, of about 5.72 mm (0.225 inch) and a horizontal spacing, d, of about 3.18 mm (0.125 inch). With the exception of the mandrels adjacent to the periphery of the pin holder 43, each of the mandrels has six nearest neighbor mandrels hexagonally arranged therearound. For reasons of structural support, one of the centrally disposed mandrels (not shown) is replaced with a support member (also not shown).

The pin holder 43 resides in a base 45 having an integral upwardly-extending peripheral sidewall 47. An apertured pressure plate 49 rests on the sidewall 47 of the base 45. The pressure plate 49 has two downward-extending sidewalls 51 on opposite sides thereof as shown in FIG. 3 which support the pressure plate 49 on the sidewall 47 of the base 45. The other two sides of the pressure plate 49 are open, thereby defining a slot or chamber open at each end indicated by the numeral 53 in FIG. 4. A plurality of apertures 55 are formed through the pressure plate 49 and the pins 41 extend through the apertures. Each aperture 55 is about 0.76 mm (30 mils) larger in diameter than the outside diameter of the part to be etched. Also each aperture 55 is countersunk on the side of the pressure plate 49 facing the pin holder 43.

A backing plate 57 having a downwardly-extending peripheral sidewall 59 covers the apparatus, with the sidewall 59 thereof resting on the periphery of the pressure plate 49. A compressible sheet 61 of silicone rubber resides in the space within the sidewall 59 of the backing plate 57. The compressible sheet 61 may be a solid rubber or a plastic which is substantially insoluble and nonreactive with the etchant that is used in the novel method. The sheet 61 has a substantially-uniform thickness and is thicker than the height of the sidewall 59 of the backing plate 57 so that the sheet 57 is compressed when the backing plate 57 rests on the spacer plate 49. The pins 41 are of such length that they extend through the apertures 55 into the sheet 61 further compressing the sheet 61. Two locating bolts 63 and locking nuts 65 hold the above-described assembly together through registered apertures in each of the plates on opposite sides of the assembly. A stiffener 67 is welded to the top of the backing plate 57. Two rods 69 with handles (not shown) at the ends thereof are attached to the stiffner.

To practice the novel method, blanks or parts (not shown) are positioned over the pins 41 substantially as described in FIG. 1. The pin holder 43 next is positioned in the base 45 with the support member (not shown) disposed in the center of the pin holder 43. Then, the pressure plate 49 is positioned over the base 45 with the pins 41 and the parts extending through the apertures 55. The support member contacts the pressure plate 49 and acts as a center support therefore to prevent deformation of the pressure plate. Now, a compressible sheet 61 of silicone rubber is positioned in the backing plate 57, and that combination is positioned on the pressure plate 49. The two locating bolts 63 are positioned in the registered apertures in each of the above-mentioned plates. Then, the locking nuts 65 are screwed down on the bolts 63 thereby urging the backing plate 57 towards the pressure plate 49. The compressible sheet 61 is squeezed against the endwalls of the parts and also against adjacent portions of the sidewalls of the parts, thereby masking selected surface portions of the parts.

Figure 6:
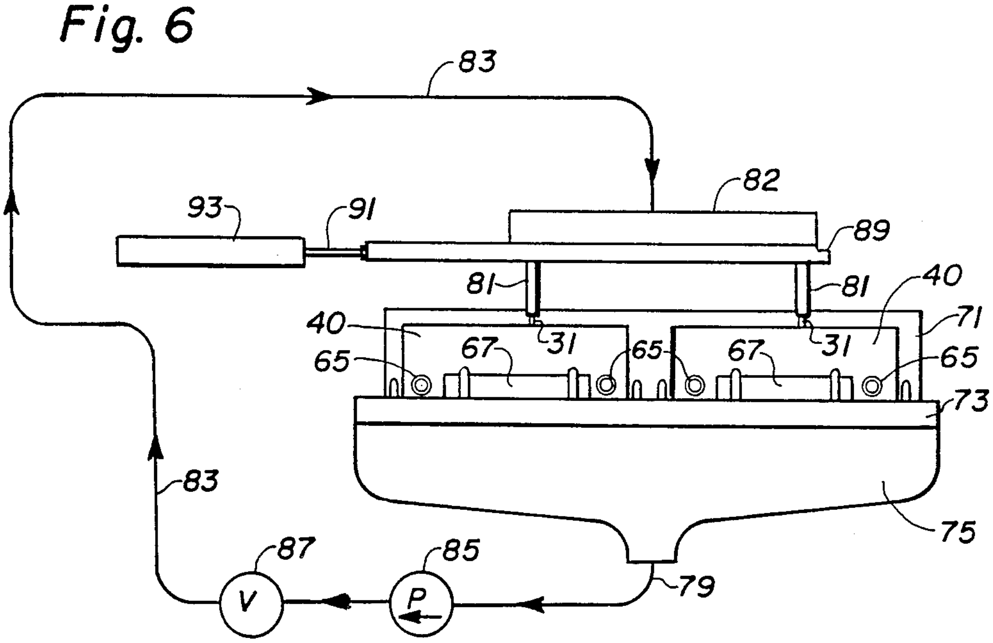
FIG. 6 is a partially schematic sectional elevational view of an apparatus in which parts are being etched in each of two fixtures shown in FIGS. 3 and 4.

Two fixtures 40, loaded with blank parts as described above, are loaded into a stationary fixture stand 71 shown in FIG. 6 and preheated to a temperature of about 80° C. in a hot water bath for about 6 minutes to minimize cooling of the etchant. The stand 71 is supported from a table 73 and fits into a basin 75 which also is supported from the table 73. The basin 75 includes a central drain 79 connected to a distributor tank 82 through flexible plastic piping 83, a pump 85 and a valve 87. The distributor tank 82 stores a relatively small amount of etchant during etching, and has two nozzles 81 in its bottom wall, from which the etchant can issue by gravity in two solid limp streams 31, one for each fixture 40. The distributor tank 82 and nozzles 81 are mounted above the fixtures 40 on a reciprocating arm 89 which is connected to the piston rod 91 of a pneumatic cylinder 93. To operate the apparatus, etchant is poured into the basin 75, the pump 85 is operated continuously and the valve 87 is adjusted so that each nozzle 81 delivers about 1.0 gpm (gallon per minute) in each solid limp stream 31. The pneumatic cylinder 93 is activated to move the arm 89 horizontally somewhat less than the length of each fixture in about 5.5 seconds (but can be in the range of 6 to 30 seconds). The nozzles pass over and deliver etchant into the slots 53 in each of the fixtures 40. The etchant drains out of the fixtures into the basin 75 from which it is recirculated back to the nozzles 81 until the etching step is completed.

Initially, the etching solution consists essentially of 45 weight parts of a 71 weight-percent solution of nitric acid, 10 weight parts of an 85 weight-percent phosphoric acid solution, 5 weight parts concentrated sulfuric acid (S.G. 1.2158) and 40 weight parts of deionized water. The etching solution is maintained at a temperature of about 80° C.±5° C. throughout the etching step. The etching step is conducted for about 6 minutes (but can be in the range of 2 to 6 minutes) at this temperature whereby the nozzles make 66 passes (33 cycles) over the fixtures 40. Complete etching leaves a dull metallic finish on the etched portions of the parts. Incomplete etching can be recognized by the presence of shiny areas where the dull metallic finish should appear. After the etching step is completed, the fixtures 40 are removed from the stand 71, and deionized water at 60° C.±5° C. is run through them for about 5 minutes followed by a dionized water rinse at room temperature (23° C.) for about 2 minutes to reestablish the thermal equilibrium of the fixtures. Then, after the fixtures 40 are disassembled, the etched parts are removed from the pins and placed in an overflow rinse container, where the cathode substrates are rinsed in deionized water at a temperature of about 60° C.±5° C. flowing at a rate of about 3 gpm (gallons per minute) for about 5 minutes. The cathode are dried either by spin drying or in a filtered air oven (not shown).

The compressible silicone rubber sheet 61 can be replaced with a sheet of another compressible solid material that is resistant to chemical attack by the etchant. The preferred material is a room-temperature vulcanizing (RTV) silicone rubber. A compressible silicone rubber sheet may be prepared by casting a mixture of about 54 weight-percent liquid silicone elastomer (such as Sylgard 186 marketed by Dow-Corning, Midland, Mich.), 6% catalyst for the elastomer, and 40% liquid viscosity reducer (such as Silicone Rubber Diluent 910 marketed by General Electric Co., Waterford, N.Y.). The casting is permitted to cure overnight at about room temperature. Decreasing the content of viscosity reducer makes the silicone rubber product stiffer and less compressible, while increasing the content of viscosity reducer makes the product softer and more compressible.

The staggering of the mandrels or pins 41 provides a 7 percent increase in the number of cathodes (318 versus 298) that can be processed in each of the fixtures 40. Additionally, the yield, utilizing the combination of the limp stream and the novel method, also has increased since more oxygen, from the air, is added to the etchant because of the turbulence created by the staggered pins 41. This, in turn, has improved the processing since there is now a faster interchange of fresh etchant at the surface of each part, an increase in etch rate, greater uniformity of etch and the turbulence has minimized the formation of stagnant pools of etchant encountered with the orthogonal array of pins utilized in the prior art methods. It has been determined that the novel method, with the increase in turbulence, increases the etch bath life by about 50 percent.

What is claimed is;

1. In a method for preparing an integral cathode substrate and support including (a) providing a plurality of formed metallic parts, each of said parts including a cathode substrate and an integral support therefor, (b) mounting said parts in spaced relation on a pin holder, (c) masking selected portions of the surface of said parts with an etch resistant mask, (d) etching the unmasked portions of the surface of said parts to a desired depth, (e) and then removing said mask, the improvement wherein said mounting step is conducted by arranging said parts in a staggered array to increase the turbulence of the etchant during said etching step, thereby providing additional oxygen to increase the rate and uniformity of the etching.

2. The method of claim 1, wherein said parts are disposed in a substantially hexagonal array.

3. The method of claim 1, wherein said etching step is conducted by alternately directing a solid limp stream of liquid etchant into and out of contact with said parts while permitting said etchant to drain away from said parts by the force of gravity.

4. In a method for preparing an integral cathode substrate and support including (a) providing a plurality of formed metallic parts, each of said parts including a cathode substrate and an integral support therefor, (b) mounting said parts on a plurality of mandrels set in spaced relation on a pin holder, (c) masking selected portions of the surface of said parts with an etch resistant mask, (d) etching the unmasked portions of the surface of said parts to a desired depth, (e) and then removing said mask, the improvement wherein said mounting step is conducted by arranging said mandrels in a staggered array to increase the turbulence of the etchant during said etching step, thereby providing additional oxygen to increase the rate and uniformity of the etching.

5. The method of claim 4, wherein said pin holder includes odd and even columns and rows of mandrels, the even columns and rows being offset relative to the odd columns and rows.

6. The method of claim 5, wherein said mandrels are disposed in a substantially hexagonal array.

7. The method of claim 4 wherein said etching step is conducted by alternately directing a solid limp stream of liquid etchant into and out of contact with said parts while permitting said etchant to drain away from said parts by the force of gravity.

* * * * *